United States Patent
Scrofano

(10) Patent No.: US 6,944,231 B2
(45) Date of Patent: Sep. 13, 2005

(54) DEMODULATION OF MULTIPLE-CARRIER PHASE-MODULATED SIGNALS

(75) Inventor: Ronald Scrofano, Thousand Oaks, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 751 days.

(21) Appl. No.: 09/948,071

(22) Filed: Sep. 6, 2001

(65) Prior Publication Data

US 2003/0063679 A1 Apr. 3, 2003

(51) Int. Cl.[7] .............................................. H04K 1/10
(52) U.S. Cl. ....................................................... 375/260
(58) Field of Search ................................ 375/260, 259; 370/252

(56) References Cited

U.S. PATENT DOCUMENTS

| 4,179,586 A | | 12/1979 | Mathews, Jr. et al. | |
| 4,217,909 A | * | 8/1980 | Papadofrangakis et al. | 600/441 |
| 5,631,610 A | | 5/1997 | Sandberg et al. | |
| 5,970,053 A | * | 10/1999 | Schick et al. | 370/252 |
| 6,181,714 B1 | * | 1/2001 | Isaksson et al. | 370/491 |

OTHER PUBLICATIONS

Anthony Dandridge, Alan B. Tveten, and Thomas G. Giallorenzl; "Homodyne Demodulation Scheme for Fiber Optic Sensors Using Phase Generated Carrier"; IEEE Journal of Quantum Electronics, vol. QE–18, No. 10, Oct. 1982; IEEE Operations Center, 445 Hoes Lane, Piscataway, NJ 08855–1331; USA.

* cited by examiner

Primary Examiner—Stephen Chin
Assistant Examiner—Jia Lu
(74) Attorney, Agent, or Firm—Patti & Brill, LLC

(57) ABSTRACT

A Fourier transform is applied (205) to a received multiple-carrier phase-modulated signal. The output of the transform includes real and imaginary elements that are associated with the multiple carriers. These elements are processed to provide a magnitude (209) and a sign (211) for the quadrature, Q, and in-phase, I, components of the desired signal. Q and I are processed (213) to yield the desired output signal that approximates the originally obtained signals that were phase-modulated and transmitted on the multiple carriers.

18 Claims, 3 Drawing Sheets

DEMODULATION OF MULTIPLE-CARRIER PHASE-MODULATED SIGNALS

FIELD OF THE INVENTION

This invention relates to communications, including but not limited to demodulation of multiple-carrier phase-modulated signals.

BACKGROUND OF THE INVENTION

Fiber optic sensor systems utilize phase-modulated carriers to transmit information of interest in the phase of an optical signal. The carrier is manifested as a sinusoidal phase modulation of the optical wave that is used by a pressure sensitive optical sensor. The pressure information transduced by the optical sensor adds an additional phase modulation to the optical signal. When the optical signal is received at a remote location, usually via fiber optic media, the pressure information is extracted from the optical signal in a process known as demodulation.

Demodulation involves converting the optical signal to an electrical signal. In digitally oriented systems, the analog electrical signal is passed through an analog-to-digital (A/D) converter, after which the desired pressure information may be extracted via digital means. In a Frequency Division Multiplexed (FDM) system, multiple optical carriers are combined through an array of sensors. The resultant electrical signal is very complex. This situation is analogous to an Frequency Modulation (FM) cable system where many carriers or channels are transmitted on a single conductor. When demodulating an FM signal, the conventional process is called heterodyning.

While similar to heterodyning, the conventional process of demodulating an optical sensor system is called homodyning. The process of utilizing homodyning to extract a signal with many carriers is very process intensive. Two mixers are utilized for each of the multiplexed carriers. These mixers down-convert the carrier signal's first and second harmonics to baseband. The mixing process produces numerous undesirable harmonics that must be filtered out. A series of lowpass filtering stages is utilized to recover the desired in-phase and quadrature signal. When such a process is performed on carrier signals in the MHz range, the processor performing the mixing and filtering may be required to perform billions of mathematical operations per second. Although such a process is not impossible, it is difficult to implement such a process with hardware that fits in a small space and consumes low power.

Accordingly, there is a need for an apparatus for and method of demodulating multiple-carrier phase-modulated signals that does not produce unwanted signals while utilizing a reduced amount of computation when compared to known methods.

SUMMARY OF THE INVENTION

A method of demodulating multiple-carrier phase-modulated signals comprises the steps of receiving a multiple-carrier phase-modulated signal and converting the multiple-carrier phase-modulated signal from analog to digital, yielding a digital signal. A Fourier transform is performed on the digital signal, yielding a plurality of real and imaginary elements associated with an $n^{th}$ carrier, where n is an integer. A magnitude of an in-phase component for the $n^{th}$ carrier and a magnitude of a quadrature component for the $n^{th}$ carrier is determined from the plurality of real and imaginary elements associated with the $n^{th}$ carrier. A sign is established for the in-phase component for the $n^{th}$ carrier from a first subset of the plurality of real and imaginary elements associated with the $n^{th}$ carrier. A sign is established for the quadrature component for the $n^{th}$ carrier from a second subset of the plurality of real and imaginary elements associated with the $n^{th}$ carrier. The in-phase component and the quadrature component are processed to yield an output signal associated with the $n^{th}$ carrier.

DESCRIPTION OF A PREFERRED EMBODIMENT

The following describes an apparatus for and method of applying a Fourier transform to a received multiple-carrier phase-modulated signal. The output of the transform includes real and imaginary elements that are associated with the multiple carriers. These elements are processed to provide a magnitude and a sign for the quadrature, Q, and in-phase, I, components of the desired signal. Q and I are processed to yield the desired output signal that approximates the originally obtained signals that were phase-modulated and transmitted on the multiple carriers.

Figure 1:
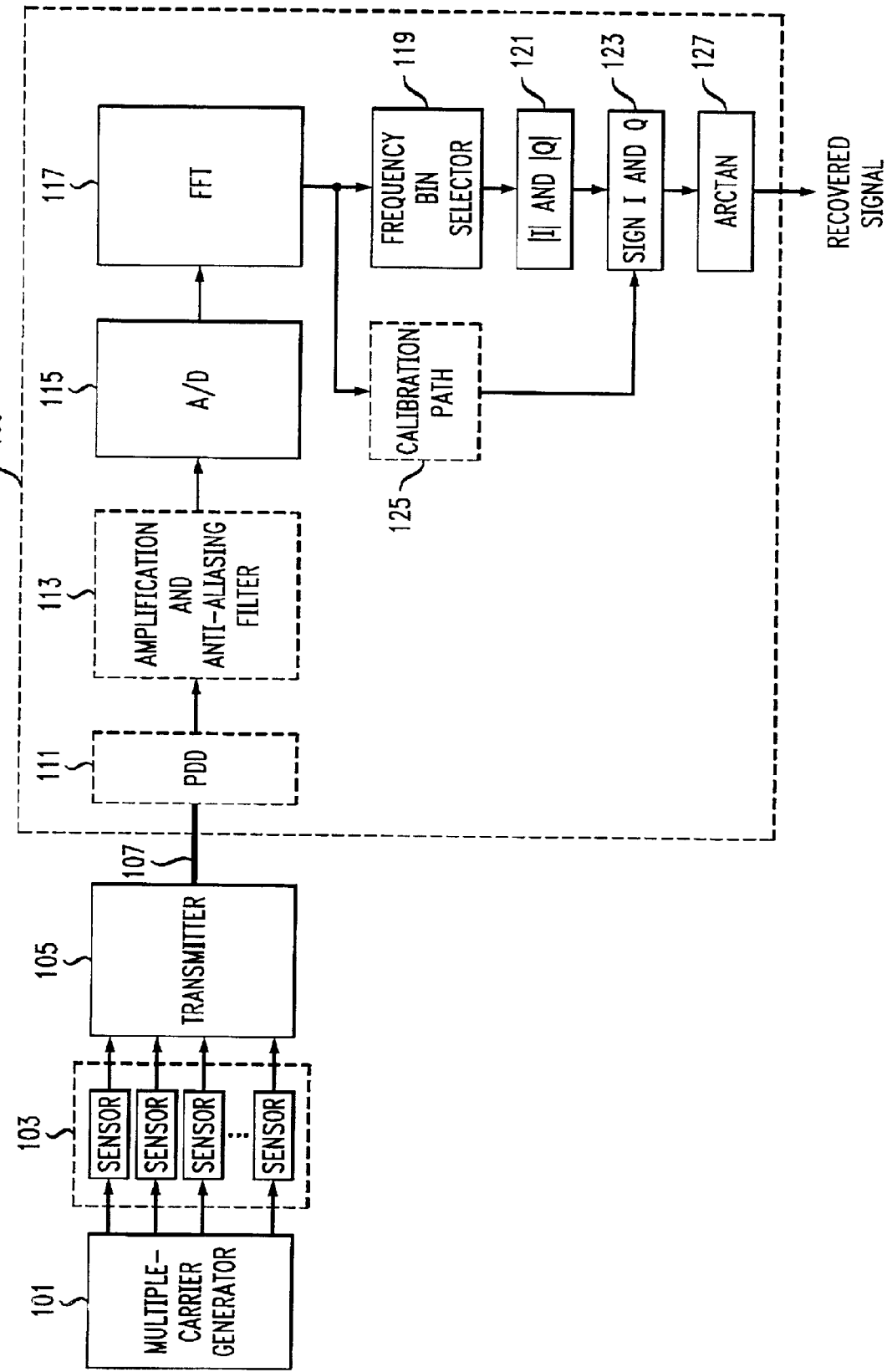
FIG. 1 is a block diagram of a communication system in accordance with the invention.

A block diagram of a communication system is shown in FIG. 1. Although the system of FIG. 1 is depicted as an optical communication system, the principles of the invention may be successfully applied to radio frequency (RF) communication systems or other types of systems that employ multiple-carrier phase-modulated signals. A multiple-carrier generator 101 generates a plurality of carriers, typically one for each of a plurality of sensors in a sensor array 103. Each of the sensors in the sensor array 103 receives or senses data that the sensor then proportionally modulates onto one of the carriers. The sensors may be optical sensors that receive data and generate an optical output signal. The outputs from the sensors in the sensor array 103 are input to a transmitter 105. For the optical example, the transmitter 105 combines the sensor array's 103 signals and couples them together for transmission through a communication medium 107, which for optical data, is an optical medium 107 such as fiber optic cable or air or empty space in the case where the transmitter is a laser.

The present invention is applicable to other transmission devices and transmission media, such as RF, wireline, acoustic, and so forth, whether solid, liquid, or gas. In the case where an RF signal is to be transmitted, the transmitter 105 is an RF transmitter that receives and transmits over the air multiple-carrier phase-modulated signals that are generated by devices known in the RF art. The transmitter 105 provides appropriate amplification to transmit the RF signal in appropriate communication channels 107, such frequencies and/or timeslots. Similar adjustments are made for other transmission types.

The multiple-carrier phase-modulated signal is received at a demodulator 109 that demodulates the signal. The demodulator 109 may include a polarization diversity detector (PDD) 111 that converts an optical signal to an electrical signal, as necessary. An optional amplification and anti-aliasing filter 113 provides any necessary amplification/attenuation or anti-aliasing functions. An analog-to-digital (A/D) converter 115 converts the signal from an analog signal to a digital signal, as known in the art. Multiple A/D converters 115 may be implemented. A fast Fourier transformer 117 takes a fast Fourier transform (FFT), which is a fast algorithm version of a discrete Fourier transform (DFT), as known in the art. Alternatively, a DFT may be used instead of an FFT.

The output of the FFT 117 is input to a frequency bin selector 119 that takes the FFT output data and places it in frequency bins associated with each carrier's first harmonic and second harmonic. A frequency bin is a spectral frequency corresponding to the complex number output by the FFT for that frequency. An FFT outputs as many frequency bins as is the size of the FFT. For example, a 256-point FFT outputs 256 complex numbers corresponding to 256 spectral values in 256 frequency bins.

A magnitude block 121 (magnitude determiner) determines the magnitude of the in-phase (I) and quadrature (Q) signal components for each carrier. The in-phase (I) signal value for a carrier is determined from the frequency bin data associated with the 2nd harmonic of the carrier, and the quadrature (Q) signal is determined from the frequency bin data associated with the 1st harmonic of the carrier. A sign block 123 establishes a sign for the I and Q signal components for each carrier. The sign block 123 (an in-phase sign establisher and a quadrature sign establisher) may be a single block or separate blocks that establish a sign for the I and Q. The calibration path 125 receives the FFT output and optionally performs various calibration functions that may be useful in the sign determination process that takes place in the sign block 123. Further details on the functionality of the frequency bin selector 119, magnitude block 121, sign block 123, and calibration path 125 are described below. A process that takes an arctangent 127 of the Q/I quotient yields the desired recovered signal. Additional processing on the received signal may also be performed.

Because it is desired to recover the signal $\Phi_n(t)$ for the $n^{th}$ carrier from the received multiple-carrier phase-modulated signal, the following is provided to show how to obtain $Q_n(t)$ and $I_n(t)$ in order to determine $\Phi_n(t)$ for the $n^{th}$ carrier. A voltage that represents an optical signal may be written as:

$$V = A + B \cos(C \cos \omega t + \Phi(t)), \quad (1)$$

where:
V=voltage of the signal;
A=DC (direct current) offset component of the voltage;
B=peak amplitude of the time varying portion of the voltage;
C=modulation depth of the phase generated carrier;
ω=modulation frequency;
t=time; and
$\Phi(t)$=signal of interest to be recovered.

In a frequency division multiplexed (FDM) system, multiple carrier signals are present, and each carrier signal simultaneously obeys the above equation. Applying equation (1) to a multi-carrier system yields:

$$V_n = A_n + B_n \cos(C_n \cos \omega_n t + \Phi_n(t)) \quad (2)$$

where:
$V_n$=voltage of the $n^{th}$ carrier signal;
$A_n$=DC offset component of the $n^{th}$ carrier voltage;
$B_n$=peak amplitude of the time varying portion of the $n^{th}$ carrier voltage;
$C_n$=modulation depth of the $n^{th}$ phase generated carrier;
$\omega_n$=modulation frequency of the $n^{th}$ carrier;
t=time; and
$\Phi_n(t)$=signal of interest on the $n^{th}$ carrier to be recovered.

The combined signal, as present on a single communication medium, such as a conductor, is:

$$S = \sum_{n=1}^{N} V_n, \quad (3)$$

where:
S=combined signal of all the carriers;
N=total number of carriers; and
$V_n$=induced voltage of the $n^{th}$ carrier.
Equation (2) may be rewritten using Bessel functions as:

$$V_n = A_n + B_n \left\{ \left( J_0(C_n) + 2\sum_{k=1}^{\infty} (-1)^k J_{2k}(C_n) \cos 2k\omega_n t \right) \cos\Phi_n(t) - \left( 2\sum_{k=0}^{\infty} (-1)^k J_{2k+1}(C_n) \cos(2k+1)\omega_n t \right) \sin\Phi_n(t) \right\}, \quad (4)$$

where:
$V_n$=voltage of the $n^{th}$ carrier signal;
$A_n$=DC offset component of the $n^{th}$ carrier voltage;
$B_n$=peak amplitude of the time varying portion of the $n^{th}$ carrier voltage;
$C_n$=modulation depth of the $n^{th}$ phase generated carrier;
$\omega_n$=modulation frequency of the $n^{th}$ carrier;
t=time;
$\Phi_n(t)$=signal of interest on the $n^{th}$ carrier to be recovered; and
$J_k$=Bessel Function of the First Kind of the $k^{th}$ order.

Extracting $\cos \Phi_n(t)$ and $\sin \Phi_n(t)$ from equation (4) helps to obtain $\Phi_n(t)$, the signal of interest. By applying an arctangent function to the sine and cosine terms, the desired signal, $\Phi_n(t)$, is recoverable:

$$\Phi_n(t) = \arctan(\sin \Phi_n(t)/\cos \Phi_n(t)). \quad (5)$$

The cosine and sine terms of equation (5) are typically referred to as the in-phase and quadrature terms, I and Q, respectively. Thus, $I_n(t) = \cos \Phi_n(t)$ and $Q_n(t) = \sin \Phi_n(t)$. Substituting for these identities in equation (5) yields:

$$\Phi_n(t) = \arctan(Q_n(t)/I_n(t)). \quad (6)$$

Thus, finding $Q_n(t)$ and $I_n(t)$ and taking the arctangent of their quotient yields the desired signal, $\Phi_n(t)$, for the $n^{th}$ carrier.

Equation (4) shows that the in-phase term is multiplied by the summation of the even harmonics of $\omega_n$ and the quadrature term is multiplied by the summation of the odd harmonics of $\omega_n$ and the associated Bessel functions. Because the summations in equation (4) go to infinity, many terms may be used to extract the desired I and Q terms. Typically, the first harmonic of $\omega_n$ (that is, $\omega_n$ itself) and its second harmonic, $2\omega_n$, are used. To isolate the terms of interest, the remaining terms of equation (4) are typically eliminated.

In order to have an even balance of power between the in-phase and quadrature terms, a value for $C_n$ is typically chosen such that $J_2(C_n)$ and $J_1(C_n)$ are equal. A value that is suitable for this aspect is $C_n = 2.62987$ for all n. The actual function value of $J_2(C_n)$ and $J_1(C_n)$ are not critical as long as they are equal, because the arctangent takes a ratio of I and Q, and the actual values of $J_2(C_n)$ and $J_1(C_n)$ will cancel out.

By managing $C_n$, commonly referred to as the modulation depth, and eliminating the unwanted terms of equation (4), including the DC (or 0 frequency) terms, the in-phase and quadrature terms may be recovered. Appropriate management of the modulation depth directly impacts what is referred to as the balance of I and Q. The average magnitude of I and Q over time are preferably the same, otherwise the arctangent function of equation (5) above may not produce the correct result. Techniques to manage the balance of I and Q for the homodyne approach and the FFT approach are similar. Likewise, the use of the arctangent function and other subsequent processing necessary to produce the final desired data after I and Q are obtained is the same with either approach. Obtaining I and Q from equation (4) is, however, different using the FFT approach in an FDM system rather than a homodyne approach.

The homodyne and FFT approaches typically start with an analog front end filter that removes most harmonics above the $2^{nd}$ harmonic of the highest carrier frequency in the system. The homodyne system performs a real mix of each of the carriers and its $2^{nd}$ harmonic to spectrally move the result to DC, where the I and Q signals may be extracted, as is similar to the process performed in a conventional heterodyning radio system. A real mix (a real mix performs multiplication with real numbers as opposed to a complex mix that performs multiplication with complex numbers) of a signal to spectrally move it down to DC also produces a sum term that creates an unwanted signal at twice the frequency. These unwanted sum terms are generally filtered out with a lowpass filter. A homodyned FDM system requires two mixers and two sets of low pass filters for each carrier that is present on a common conductor. Although it is typically performed in a digital environment, the homodyne approach may be performed in an analog environment. Both the digital homodyne and FFT approaches typically utilize analog to digital converters in their receivers. The FFT approach, however, does not perform mixing operations, thus unwanted sum terms that need to be filtered out are not created. The carriers and their $2^{nd}$ harmonics are used without first spectrally shifting them to DC.

Figure 2:
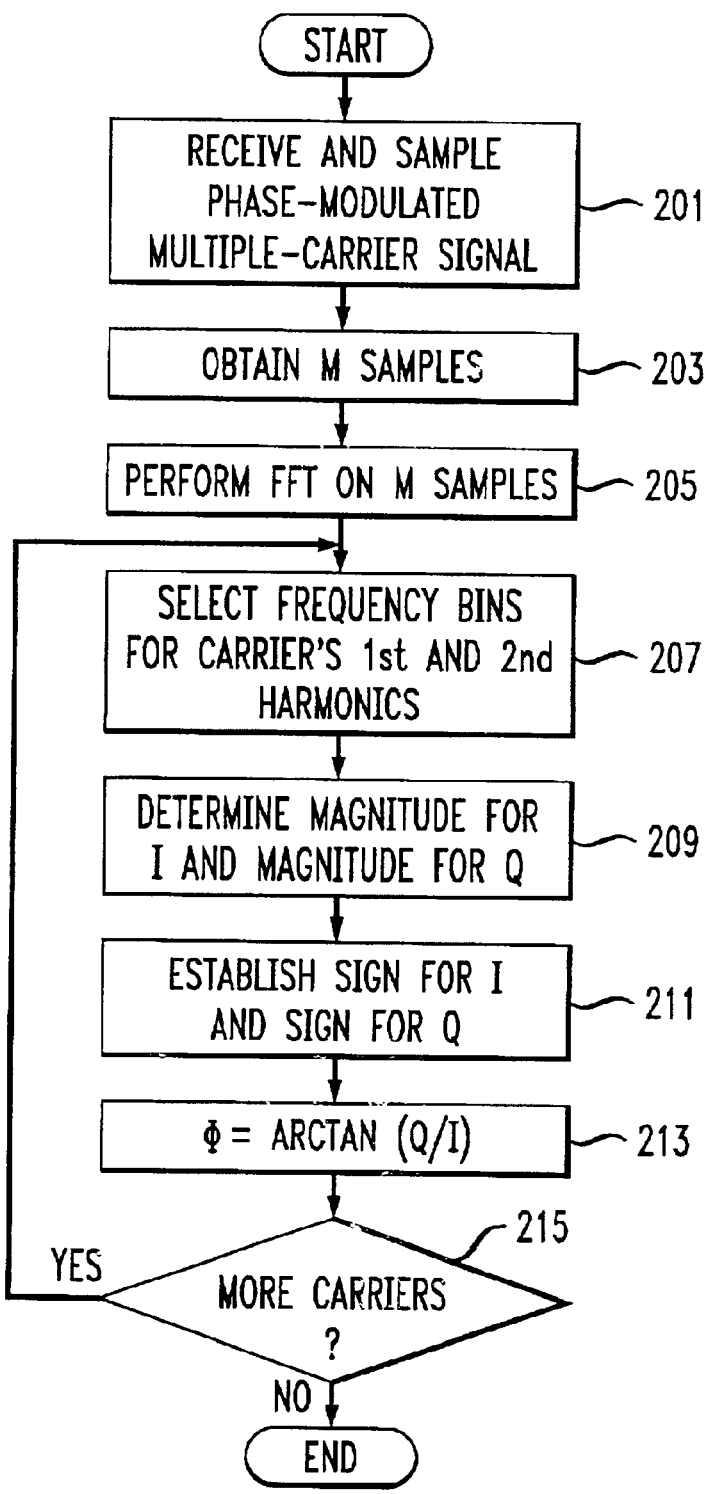
FIG. 2 is a flowchart showing a method of demodulating multiple-carrier phase-modulated signals in accordance with the invention.

A flowchart showing a method of demodulating a multiple-carrier phase-modulated signal is shown in FIG. 2. At step 201, a multiple-carrier phase-modulated signal is received and sampled. The demodulation process may include, for example, applying a PDD 111, amplifying the received signal, applying an anti-aliasing filter 113, and/or employing an analog-to-digital (A/D) converter 115. In the example that is described herein, the data is digital data output by the A/D converter 115 as may be represented by equation (3). At step 203, the digital data is collected until M samples are obtained. M is an integer whose value will be described later.

At step 205, a Fourier transform of size M is performed. The Fourier transform may be a DFT or FFT. For computational efficiency, an FFT is utilized, as is well known in the art. An example of an FFT process is described in a book titled "The Fast Fourier Transform" by E. Oran Brigham, Prentice-Hall, Inc., Englewood Cliffs, N.J., 1974. The FFT is a computationally efficient way to compute all the possible outputs of equation (7) below simultaneously without the brute force evaluation of equation (7) as it is written. The FFT results are the same as the DFT results. The output of the DFT/FFT process is a plurality of real and imaginary elements that are associated with each of the n carriers. The details of an example of this process are as follows.

An example of a transform from the time domain to the frequency domain is:

$$G(h/MT) = \sum_{p=0}^{M-1} g(pT)e^{-j2\pi hp/M}, \quad (7)$$

where:

M=number of input samples in the time domain to be used to calculate the DFT/FFT, commonly referred to as the size of the DFT/FFT;

p=sample index; an integer between 0 and M−1 relative to the first input sample, denoted as sample 0;

$j=\sqrt{-1}$;

T=period of time between input samples;

$g(pT)=p^{th}$ time domain sample at time pT (may be complex or real);

h=output frequency bin index and is an integer between 0 and M−1;

h/MT=frequency represented by the $h^{th}$ bin; and

G(h/MT)=complex value that represents the complex phasor in the $h^{th}$ frequency bin.

The sample rate frequency, $F_s$, is often used instead of T, and is represented by:

$$F_s = 1.0/T. \quad (8)$$

If T is in seconds, $F_s$ is in Hz.

For optimized results with the FFT, e.g., minimal calculations without resultant excess noise terms that need to be filtered out, M is selected (or the carriers may be selected) such that each carrier's frequency, as well as the frequency of each carrier's second harmonic, matches the frequency of an FFT output bin. For this optimized result, each $\omega_n$ from equation (4) is expressed as:

$$\omega_n = 2\pi(h_n/M)F_s, \quad (9)$$

where $h_n$ is an integer such that $0 \leq h_n \leq (M/2)-1$.

Additional benefit is gained when the second harmonic of $\omega_n$, i.e., $2\omega_n$, also falls within a bin and equation (9) is met, i.e., $2\omega_n = 2\pi(2h_n/M)F_s$. In other words, when all carrier frequencies and their second harmonics are integer multiples of $2\pi(1.0/M)F_s$, which is the frequency resolution of the output of the DFT or the bin width in frequency, the DFT/FFT calculations are optimized.

Figure 3:
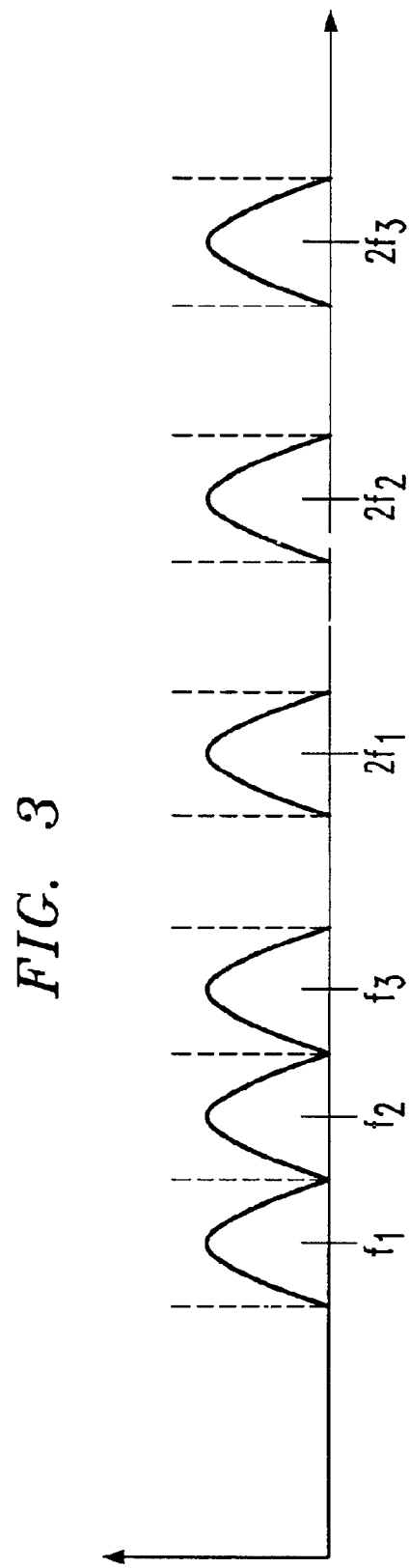
FIG. 3 is a diagram illustrating multiple frequency carriers in accordance with the invention.

A diagram illustrating an example of a selection of frequency carriers is shown in FIG. 3. This example shows three frequency carriers, although a large number of carriers and various different bandwidths may be utilized, given frequency availability. The example frequency diagram shows three carrier frequencies, $f_1=3.0$ MHz, $f_2=3.4$ MHz, and $f_3=3.8$ MHz. In this example, the bandwidth for each channel is 400 kHz for each frequency. The second harmonics for the carriers $f_1$, $f_2$, and $f_3$ are also shown in the diagram as $2f_1=6.0$ MHz, $2f_2=6.8$ MHz, and $f_3=7.6$ MHz, respectively.

Because the input to the DFT/FFT is real, all imaginary components are zero, thus $h_n$ is restricted to half the range of the total available bins. For processing speed purposes, a single complex FFT may be used to compute two real DFT/FFTs simultaneously. In this situation, a complex input stream is formed by assigning one part of the DFT/FFT input as the real part of the complex input stream and another part of the DFT/FFT input as the imaginary part of the complex input stream, and performing a single complex DFT/FFT. When multiple A/D converters are utilized, the outputs of two A/D converters may be processed by a single DFT/FFT. When the DFT/FFT is completed, a simple manipulation of the outputs provides a result that is mathematically the equivalent of performing two real DFT/FFTs.

Also at step 205, the real and imaginary elements that are output by the FFT for each carrier and its $2^{nd}$ harmonic (as well as other harmonics that were not previously filtered out, for example, by the anti-aliasing filter 113) are separated into frequency bins based on carrier frequency. Each utilized frequency bin typically includes FFT output data in the form of a single complex number that has a real element and an imaginary element associated with the carrier frequency associated with that bin. Table 1 below shows an example of frequency bins containing FFT output data in the form of real and imaginary elements for an 8-carrier system. The example includes 16 bins, each bin having a real and an imaginary part. Two bins are associated with each carrier frequency, one bin containing data corresponding to the $1^{st}$ harmonic of the carrier frequency (containing data corresponding to Q) and a second bin containing data corresponding to the $2^{nd}$ harmonic of the carrier frequency (containing data corresponding to I).

TABLE 1

|   | Q($1^{st}$ harmonic) | | I($2^{nd}$ harmonic) | |
|---|---|---|---|---|
|   | a (real) | b (imaginary) | c (real) | d (imaginary) |
| $f_1$ | 1.5 | −7.8 | 7.88 | 7.43 |
| $f_2$ | −2.5 | 9.2 | −8.34 | 1.1125 |
| $f_3$ | 7.2 | −0.11 | 6.21 | −4.78 |
| $f_4$ | −4.1 | 8.55 | −3.77 | 9.432 |
| $f_5$ | 3.7 | 3.33 | −9.05 | 6.771 |
| $f_6$ | −8.125 | −7.21 | −8.11 | 6.334 |
| $f_7$ | 5.0978 | 8.78 | 5.77 | −0.005 |
| $f_8$ | 3.45 | −9.88 | 7.654 | −2.3974 |

The complex number that is output in each frequency bin is often referred to as a phasor. The complex number is a rotating phasor, because each time the FFT input is stepped M samples forward in time in the input stream, the next computation of the FFT shows that the phasor has rotated. When the carriers follow equation (9), it may be shown that the rotation is always an integer multiple of $2\pi$. That is, the carrier phase angle rotation from one FFT to the next is:

$$\omega_n MT = 2\pi(h_n/M)F_s MT = 2\pi h_n. \tag{10}$$

When the FFT is stepped exactly M samples each cycle, the carrier phasor is stationary, thus the carrier is effectively eliminated. The homodyne approach utilizes mixers to bring each carrier to DC, which mixers produce unwanted harmonics that need to be filtered out. Thus, the DFT/FFT approach eliminates the need for mixers and filtering to remove unwanted harmonics, in addition to being computationally efficient.

Carriers are typically processed one at a time. At step 207, the frequency bins for the $1^{st}$ and $2^{nd}$ harmonics for the carrier being processed are selected. At step 209, a magnitude of $I_n(t)$ and a magnitude of $Q_n(t)$ are determined. The magnitude of the complex number in the frequency bin associated with the $1^{st}$ harmonic of the $n^{th}$ frequency carrier is directly proportional to the magnitude of $Q_n(t)$. The magnitude of the complex number in the frequency bin associated with the $2^{nd}$ harmonic of the $n^{th}$ frequency carrier is directly proportional to the magnitude of $I_n(t)$. The DFT/FFT approach has the additional benefit that any DC components in the original signal are removed, because DC components show up in the zeroth frequency bin, which is discarded. The following description provides details describing an example of a method for finding the magnitude of $I_n(t)$ and the magnitude of $Q_n(t)$.

Discrete time sample notation common to digital signal processing analysis will be utilized. In addition, both the phase of the carrier signals and the start sample index of the FFT input data set relative to the carrier nominal zero phase will be shown. Substituting in equation (4):

$$\omega_n t \Rightarrow \omega_n(p+L)T + \Psi_n, \tag{11}$$

where:
p=an integer representing the $p^{th}$ sample index relative to the start of process time, $0 \leq p \leq \infty$;
L=relative offset of samples to the start of the FFT input, i.e., the start sample index;
T=sampling period, which may be the same as in equation (7); and
$\Psi_n$=relative phase of the $n^{th}$ carrier to time zero.

After the above substitution in equation (4) and subsequently eliminating the Bessel terms of the equation and $B_n$ because these terms will cancel out in the arctangent calculation, the in-phase and quadrature terms in sample notation and in normalized form may be written as follows:

$$Q_{np} = \cos[\omega_n(p+L)T + \Psi_n] \cdot \sin \Phi_n((p+L)T) \tag{12}$$

and $$I_{np} = \cos(2[\omega_n(p+L)T + \Psi_n]) \cdot \cos \Phi_n((p+L)T) \tag{13}$$

After applying trigonometric identities and algebraic manipulation, equations (12) and (13) become:

$$Q_{np} = \{\cos(\omega_n pT)\cos(\omega_n LT + \Psi_n) - \sin(\omega_n pT)\sin(\omega_n LT + \Psi_n)\} \cdot \sin \Phi_n((p+L)T) \tag{14}$$

and $$I_{np} = \{\cos(2\omega_n pT)\cos(2(\omega_n LT + \Psi_n)) - \sin(2\omega_n pT)\sin(2(\omega_n LT + \Psi_n))\} \cdot \cos \Phi_n((p+L)T). \tag{15}$$

Q and I as defined in equations (14) and (15) are real numbers. The output of the FFT in a given frequency bin is a complex number. The relationship between the complex FFT output and the real result of equations (14) and (15) is as follows. The magnitude of the complex number in a frequency bin is proportional to the magnitude of either Q or I, and because (14) and (15) may be positive or negative, the correct sign needs to be established for Q and I. By expanding the exponential term of equation (7) and applying Euler's formula:

$$e^{-j2\pi hp/M} = \cos(2\pi hp/M) - j \sin(2\pi hp/M). \tag{16}$$

Because the DFT/FFT is a sum of products involving complex numbers when the input is real, anything associated with a sine function (with zero phase) correlates with the imaginary part of equation (16) and anything associated with a cosine function (with zero phase) correlates with the real part of (16). As stated earlier, the FFT removes the carrier parts of equations (14) and (15), which is equivalent to the elimination of the $\cos(\omega_n pT)$, $\sin(\omega_n pT)$, $\cos(2\omega_n pT)$ and $\sin(2\omega_n pT)$ terms. Thus, the real and imaginary parts of the output of the FFT for the frequency bins of interest (that is the bins corresponding to the first and second harmonics) are proportional to the remaining corresponding cosine and sine parts of equations (14) and (15). In transform notation, where $\Leftrightarrow$ designates "is the transform pair of":

$$Re\{Q_n\} \Leftrightarrow \cos(\omega_n LT + \Psi_n) \cdot \sin \Phi_n((p+L)T); \tag{17}$$
$$Im\{Q_n\} \Leftrightarrow -\sin(\omega_n LT + \Psi_n) \cdot \sin \Phi_n((p+L)T); \tag{18}$$

and $$Re\{I_n\} \Leftrightarrow \cos(2(\omega_n LT + \Psi_n)) \cdot \cos \Phi_n((p+L)T); \tag{19}$$
$$Im\{I_n\} \Leftrightarrow -\sin(2(\omega_n LT + \Psi_n)) \cdot \cos \Phi_n((p+L)T). \tag{20}$$

The FFT output in each frequency bin is a single complex number that resulted from M time domain inputs. Thus, the $\sin \Phi_n((p+L)T)$ and $\cos \Phi_n((p+L)T)$ parts of equations (17), (18), (19), and (20) that are represented by the real and imaginary parts of the single complex number are an average number produced at the FFT computation rate, not the actual time domain sample rate. That is, the rate of usable $\Phi_n$ outputs is $F_s/M$. To achieve the desired output rate and final data resolution, $F_s$ and M are chosen such that $\Phi_n(t)$ has a small variation over the interval of M input samples. The terms with the sine and cosine of $(\omega_n LT + \Psi_n)$ in equations (17), (18), (19), and (20) are constants and are invariant in time as long as all sampling clocks and carriers are synchronized, for example, by the use of a phase locked loop from a master clock.

In order to represent the output of the FFT more conveniently than with equations (17), (18), (19), and (20), the following notations that represent the output data at the $F_s/M$ output rate rather than at the time domain input rate will be utilized.

$T_{IQ}=1.0/(F_s/M)$=output sample data interval;
$F_{IQ}=1.0/T_{IQ}$=output sample data rate;
$a_{nr}$=real part of the bin corresponding to $Q_n$ at the $r^{th}$ output time;
$b_{nr}$=imaginary part of the bin corresponding $Q_n$ at the $r^{th}$ output time;
$c_{nr}$=real part of the bin corresponding to $I_n$ at the $r^{th}$ output time; and
$d_{nr}$=imaginary part of the bin corresponding to $I_n$ at the $r^{th}$ output time.

The equations for a, b, c, and d for the $n^{th}$ carrier at the $r^{th}$ output time become:

$$a_{nr}=\cos(\omega_n LT+\Psi_n)\cdot\sin\Phi_{nr}, \quad (21)$$

$$b_{nr}=-\sin(\omega_n LT+\Psi_n)\cdot\sin\Phi_{nr}, \quad (22)$$

and $$c_{nr}=\cos(2(\omega_n LT+\Psi_n))\cdot\cos\Phi_{nr}, \quad (23)$$

$$d_{nr}=-\sin(2(\omega_n LT+\Psi_n))\cdot\cos\Phi_{nr}. \quad (24)$$

The magnitude of I and Q for the $n^{th}$ carrier at the $r^{th}$ output time may then be expressed as:

$$|Q_{nr}|=|\sin\Phi_{nr}|=\sqrt{a_{nr}^2+b_{nr}^2} \quad (25)$$

and $$|I_{nr}|=|\cos\Phi_{nr}|=\sqrt{c_{nr}^2+d_{nr}^2}. \quad (26)$$

At step 211, signs (+ or −) are established for both $I_n(t)$ and $Q_n(t)$. Because equations (25) and (26) determine magnitudes for Q and I, a sign needs to be established for Q and I prior to inputting Q and I to the arctangent function. There are many ways to establish these signs.

One method is to arbitrarily pick either Sign(a), i.e., the sign of a, or Sign(b) for the sign of Q, and likewise either Sign(c) or Sign(d) for the sign of I. As long as consistency is maintained from output to output, this method may achieve reasonable results. This method, however, has several drawbacks. Depending on the values of L and $\Psi_n$, the term picked to determine the sign may be very small and in fact may be zero. In that case an instability in the sign selection process may cause results to be poor in that the proper selection of quadrant by the arctangent would be unstable. A correction for this problem is to adjust the start sample index, L, and $\Psi_n$ such that they are zero. Shifting L, which represents the start sample index, into the FFT is relatively easy. This process may be performed by simply throwing input samples away (corresponding to sliding forward in time) prior to loading the FFT input buffer. Controlling the value of $\Psi_n$ may be more difficult. $\Psi_n$ is generally the result of path length differences due to manufacturing tolerances or cable length mismatches in the sensor system that may be difficult or costly to control or correct.

The following describes a more robust method of establishing signs for Q and I. The sign of the term (a or b for Q; c or d for I) having the highest energy or power content is the sign that is used for sign selection. The method maybe represented as:

if $a_{nr}^2 \geq b_{nr}^2$, then Sign($Q_{nr}$)=Sign($a_{nr}$), else Sign($Q_{nr}$)=Sign($b_{nr}$)(27)

and if $c_{nr}^2 \geq d_{nr}^2$, then Sign($I_{nr}$)=Sign($c_{nr}$), else Sign($I_{nr}$)=Sign($d_{nr}$).(28)

In other words, the sign chosen for Q and I is the sign of the element having the largest magnitude. This method may not be sufficiently robust, and may result in the wrong sign selection in some situations, such as when spurious noise is present.

A more stable method sums the power over many samples to minimize the effects of noisy data. This method utilizes the following summations:

$$S_{na}=\sum_{r=1}^{W} a_{nr}^2, \quad (29)$$

$$S_{nb}=\sum_{r=1}^{W} b_{nr}^2, \quad (30)$$

$$S_{nc}=\sum_{r=1}^{W} c_{nr}^2, \quad (31)$$

$$S_{nd}=\sum_{r=1}^{W} d_{nr}^2, \quad (32)$$

where W=the number of output samples to sum. A good example of a number for W is 100. The S terms from equations (29), (30), (31), and (32) are used in place of the individual terms in logical equations (27) and (28), yielding:

if $S_{na} \geq S_{nb}$, then Sign($Q_{nr}$)=Sign($a_{nr}$), else Sign($Q_{nr}$)=Sign($b_{nr}$)(33)

and if $S_{nc} \geq S_{nd}$, then Sign($I_{nr}$)=Sign($c_{nr}$), else Sign($I_{nr}$)=Sign($d_{nr}$). (34)

This summation process to determine the S terms above need not be performed continually. The summations may be performed at system startup and/or during any calibration cycle when only the carriers are on with or without any $\Phi_n(t)$ signals present. Because the phasors in each frequency bin effectively do not rotate, the same selected terms at each $r^{th}$ FFT calculation are always used to put the sign on the magnitude terms. If the selected term has a negative sign, the associated magnitude term is assigned a negative sign. If the selected term has a positive sign, the associated magnitude term is assigned a positive sign. This summation process may take place in the calibration path 125.

This technique may occasionally yield a result with a positive-negative ambiguity in the final $\Phi_n(t)$ data. The data may come out continuously with a sign opposite to that of the true sign. In many cases, such a result is not a problem. When the data of interest is relative data, the sign is not as critical as is consistency of the sign from output sample to output sample from a given carrier. A problem may arise, however, if consistency across multiple carriers on a common conductor or across multiple conductors is required. This characteristic is particularly important if the final data is to be input to a spatial beam-former or other similar device in the downstream processing.

The above problem largely results from the fact that L and particularly $\Psi_n$ are usually unknown. While L is the same for all carriers, $\Psi_n$ is unique to each carrier. For example, suppose that the sign of $a_{nr}$ is used for the sign of $Q_{nr}$. In equation (21), $\cos(\omega_n LT + \Psi_n)$ may start out as positive or negative depending on the arguments. Because L and $\Psi_n$ are unknown, an ambiguity may arise. The variable L may be adjusted by sliding the FFT forward, but the $\Psi_n$ for each carrier is more difficult to determine. Rather than bothering to determine either L or $\Psi_n$, the following calibration technique may be utilized to resolve the problem.

By transmitting the same calibration signal $\Phi_n(t)=\Phi(t)$ for all n, i.e., on each carrier, in the system at startup, a sign correction vector may be determined, thereby eliminating the above problem. Each term of the sign correction vector is either +1 or −1, and is associated with a specific carrier. The sign correction vector is applied to each carrier's $\Phi_n(t)$ output to either invert or not invert the sign during output processing. In this manner, coherence across carriers may be maintained. The calibration cycle may be repeated as necessary, for example, when the sample clock or carriers lose synchronization or when the system is restarted. This calibration process may take place in the calibration path 125. This problem is not unique to the FFT approach, and is present in the homodyne approach as well. Thus, the above calibration technique may be applied to each of the above methods of determining signs, and may be applied in a similar way in the homodyne approach.

At step 213, the arctangent of $Q_n(t)/I_n(t)$ is obtained, yielding $\Phi_n(t)$. This process, and subsequent processing steps, are similar for both FFT and homodyne approaches. If at step 215 there are more carriers to be processed, the process continues with step 207, otherwise the process ends.

The present invention provides a method and apparatus for demodulating multiple-carrier phase-modulated signals without producing unwanted signals that need to be filtered out. The present invention directly converts data, utilizing a Fourier transform, without having to first spectrally shifting data to DC. When an FFT is utilized as the Fourier transform, the benefits of reduced computation are realized, resulting in a receiver that has a reduced power consumption and fits in a smaller space when compared to previous methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:

receiving a multiple-carrier phase-modulated signal;

converting the multiple-carrier phase-modulated signal from analog to digital, yielding a digital signal;

performing a Fourier transform on the digital signal, yielding a plurality of real and imaginary elements associated with an $n^{th}$ carrier, where n is an integer;

determining a magnitude of an in-phase component for $n^{th}$ carrier from a magnitude of at least one real element and at least one imaginary element associated with a second harmonic of the $n^{th}$ carrier;

determining a magnitude of a quadrature component for the $n^{th}$ carrier from a magnitude of at least one the real element and at least one imaginary elements associated with the $n^{th}$ carrier;

establishing a sign for the in-phase component for the $n^{th}$ carrier from a first subset of the plurality of real and imaginary elements associated with the $n^{th}$ carrier;

establishing a sign for the quadrature component for the $n^{th}$ carrier from a second subset of the plurality of real and imaginary elements associated with the $n^{th}$ carrier;

processing the in-phase component and the quadrature component to yield an output signal associated with the $n^{th}$ carrier.

2. The method of claim 1, wherein plurality of phase-modulated carrier signals are optical signals, and wherein the method further comprises the step of converting the optical signals to electrical signals after the receiving step.

3. The method of claim 1, further comprising the step of and-alias filtering the plurality of phase-modulated carrier signals after the receiving step.

4. The method of claim 1, wherein the Fourier transform is a discrete Fourier transform.

5. The method of claim 1, wherein the Fourier transform is a fast Fourier transform.

6. The method of claim 1, wherein the first subset of the plurality of real and imaginary elements associated with the $n^{th}$ carrier is associated with the second harmonic of the $n^{th}$ carrier.

7. The method of claim 1, wherein the magnitude of the quadrature component, Q, at an $r^{th}$ output time is:

$$|Q_{nr}| = \sqrt{a_{nr}^2 + b_{nr}^2}$$

and the magnitude of the in-phase component, I, at the $r^{th}$ output time is $$|I_{nr}| = \sqrt{c_{nr}^2 + d_{nr}^2},$$

where:

r is an integer;

$a_{nr}$ represents a real part of the second subset of the plurality of real and imaginary elements associated with the $n^{th}$ carrier and corresponding to $Q_n$ at the $r^{th}$ output time;

$b_{nr}$ represents an imaginary part of the second subset of the plurality of real and imaginary elements associated with the $n_{th}$ carrier and corresponding $Q_n$ at the $r^{th}$ output time;

$c_{nr}$ represents a real part of the first subset of the plurality of real and imaginary elements associated with the $n^{th}$ carrier and corresponding to $I_n$ at the $r^{th}$ output time; and $d_{nr}$ represents an imaginary part of the first subset of the plurality of real and imaginary elements associated with the $n^{th}$ carrier and corresponding to $I_n$ at the $r^{th}$ output tune.

8. The method of claim 1, further comprising the steps of:

transmitting a calibration signal on each carrier;

determining an $n^{th}$ sign correction vector for the $n^{th}$ carrier;

applying the $n^{th}$ sign correction vector to the $n^{th}$ carrier's output signal.

9. The method of claim 1, wherein the step of establishing the sign for the in-phase component comprises selecting as the sign for the in-phase component one of a sign of a real element associated with a second harmonic of the $n^{th}$ carrier and a sign of an imaginary element associated with a second harmonic of the $n^{th}$ carrier.

10. The method of claim 1, wherein the step of establishing the sign for the quadrature component comprises selecting as the sign for the quadrature component one of a sign of a real element associated with a first harmonic of the $n^{th}$ carrier and a sign of an imaginary element associated with a first harmonic of the $n^{th}$ carrier.

11. The method of claim 1, wherein the step of establishing the sign for the in-phase, I, component comprises:

if $c_{nr}^2 \geq d_{nr}^2$, then $\text{Sign}(I_{nr})=\text{Sign}(c_{nr})$, else $\text{Sign}(I_{nr})=\text{Sign}(d_{nr})$, where:
r is an integer corresponding to an output time;
$c_{nr}$ represents a real part of the first subset of the plurality of real and imaginary elements associated with a second harmonic of the $n^{th}$ carrier; and
$d_{nr}$ represents an imaginary part of the first subset of the plurality of real and imaginary elements associated with the second harmonic of the $n^{th}$ carrier.

12. The method of claim 1, wherein the step of establishing the sign for the quadrature component, Q, comprises:

if $a_{nr}^2 \geq b_{nr}^2$, then $\text{Sign}(Q_{nr})=\text{Sign}(a_{nr})$, else $\text{Sign}(Q_{nr})=\text{Sign}(b_{nr})$, where:
r is an integer corresponding to an output time;
$a_{nr}$ represents a real part of the second subset of the plurality of real and imaginary elements associated with the $n^{th}$ carrier; and
$b_{nr}$ represents an imaginary part of the second subset of the plurality of real and imaginary elements associated with the $n^{th}$ carrier.

13. The method of claim 1, wherein the step of establishing the sign for the in-phase component, I, comprises:

if $S_{nc} \geq S_{nd}$, then $\text{Sign}(I_{nr})=\text{Sign}(c_{nr})$, else $\text{Sign}(I_{nr})=\text{Sign}(d_{nr})$, where:

$$S_{nc} = \sum_{r=1}^{W} c_{nr}^2,$$

$$S_{nd} = \sum_{r=1}^{W} d_{nr}^2,$$

r is an integer corresponding to an output time;
W=the number of output samples to sum;
$S_{nc}$ and $S_{nd}$ comprise summation values;
$c_{nr}$ represents a real part of the first subset of the plurality of real and imaginary elements associated with a second harmonic of the $n^{th}$ carrier; and
$d_{nr}$ represents an imaginary part of the first subset of the plurality of real and imaginary elements associated with the second harmonic of the $n^{th}$ carrier.

14. The method of claim 1, wherein the step of establishing the sign for the quadrature component, Q, comprises:

if $S_{na} \geq S_{nb}$, then $\text{Sign}(Q_{nr})=\text{Sign}(a_{nr})$, else $\text{Sign}(Q_{nr})=\text{Sign}(b_{nr})$, where:

$$S_{na} = \sum_{r=1}^{W} a_{nr}^2,$$

$$S_{nb} = \sum_{r=1}^{W} b_{nr}^2,$$

r is an integer corresponding to an output time;
W=the number of output samples to sum;
$S_{na}$ and $S_{nb}$ comprise summation values:
$a_{nr}$ presents a real part of the second subset of the plurality of real and imaginary elements associated with the $n^{th}$ carrier; and
$b_{nr}$ represents an imaginary part of the second subset of the plurality of real and imaginary elements associated with the $n^{th}$ carrier.

15. An apparatus comprising:
an analog-to-digital converter, arranged and constructed to convert a multiple-carrier phase-modulated signal into a digital signal;
a Fourier transformer, arranged and constructed to perform a Fourier transform on the digital signal, yielding a plurality of real and imaginary elements associated with an $n^{th}$ carrier, where n is an integer;
a magnitude determiner, arranged and constructed to determine a magnitude of an in-phase component for the $n^{th}$ carrier from a magnitude of at least one real element and at least one imaginary element associated with a second harmonic of the $n^{th}$ carrier and a magnitude of a quadrature component for the $n^{th}$ carrier from a magnitude of at least real element and at least one imaginary elements associated with the $n^{th}$ carrier;
an in-phase sign establisher, arranged and constructed to establish a sign for the in-phase component for the $n^{th}$ carrier from a first subset of the plurality of real and imaginary elements associated with a second harmonic of the $n^{th}$ carrier;
a quadrature sign establisher, arranged and constructed to establish a sign for the quadrature component for the $n^{th}$ carrier from a second subset of the plurality of real and imaginary elements associated with the $n^{th}$ carrier;
a processor, arranged and constructed to process the in-phase component and the quadrature component to yield an output signal associated with the $n^{th}$ carrier.

16. The apparatus of claim 15, further comprising a calibration path, arranged and constructed to determine an $n^{th}$ sign correction vector for the $n^{th}$ carrier from a calibration signal transmitted on each carrier and apply the $n^{th}$ sign correction vector to the $n^{th}$ carrier's output signal.

17. The apparatus of claim 15, wherein the in-phase sign establisher is further arranged and constructed to establish the in-phase sign based on at least one real element and at least one imaginary element associated with a second harmonic of the $n^{th}$ carrier; and
wherein the quadrature sign establisher is further arranged and constructed to establish the quadrature sign based on at least one real element and at least one imaginary element associated with a first harmonic of the $n^{th}$ carrier.

18. The apparatus of claim 15, wherein the in-phase sign establisher is further arranged and constructed to establish the sign for the in-phase component, I, by performing:

if $S_{nc} \geq S_{nd}$, then $\text{Sign}(I_{nr})=\text{Sign}(c_{nr})$, else $\text{Sign}(I_{nr})=\text{Sign}(d_{nr})$, where:

$$S_{nc} = \sum_{r=1}^{W} c_{nr}^2,$$

$$S_{nd} = \sum_{r=1}^{W} d_{nr}^2,$$

r is an integer corresponding to an output time;
W=the number of output samples to sum;
$S_{nc}$ and $S_{nd}$ comprise summation values;
$c_{nr}$ represents a real part of the first subset of the plurality of real and imaginary elements associated with a second harmonic of the $n^{th}$ carrier; and $d_{nr}$ represents an imaginary part of the first subset of the plurality of real and imaginary elements associated with the second harmonic of the $n^{th}$ carrier;

and wherein the quadrature sign establisher is further arranged and constructed to establish the sign for the quadrature component, Q, by performing:

if $S_{na} \geq S_{nb}$, then Sign($Q_{nr}$)=Sign($a_{nr}$), else Sign($Q_{nr}$)=Sign($b_{nr}$), where:

$$S_{na} = \sum_{r=1}^{W} a_{nr}^2,$$

$$S_{nb} = \sum_{r=1}^{W} b_{nr}^2,$$

r is an integer corresponding to an output time;
W=the number of output samples to sum;
$S_{na}$ and $S_{nb}$ comprise summation values;
$a_{nr}$ represents a real part of the second subset of the plurality of real and imaginary elements associated with the $n^{th}$ carrier; and
$b_{nr}$ represents an imaginary part of the second subset of the plurality of real and imaginary elements associated with the $n^{th}$ carrier.

* * * * *